United States Patent
Pulido, Jr.

(10) Patent No.: US 8,919,982 B2
(45) Date of Patent: Dec. 30, 2014

(54) LIGHTING SYSTEM FOR CLOTHING

(71) Applicant: Gabriel Pulido, Jr., Duarte, CA (US)

(72) Inventor: Gabriel Pulido, Jr., Duarte, CA (US)

( * ) Notice: Subject to any disclaimer, the term of this patent is extended or adjusted under 35 U.S.C. 154(b) by 0 days.

(21) Appl. No.: 13/961,621

(22) Filed: Aug. 7, 2013

(65) Prior Publication Data

US 2014/0347845 A1   Nov. 27, 2014

Related U.S. Application Data

(60) Provisional application No. 61/827,470, filed on May 24, 2013.

(51) Int. Cl.
  *F21V 21/08*   (2006.01)
  *F21V 33/00*   (2006.01)

(52) U.S. Cl.
  CPC .................................. *F21V 33/0008* (2013.01)
  USPC ........................................................ 362/103

(58) Field of Classification Search
  CPC ............ H05B 37/029; H05B 37/0272; H04B 5/0081; H04B 10/116; H04H 60/58; F21Y 2101/02; Y10S 362/80; A41D 1/002; A41D 27/085; A42B 1/245; A42B 3/30; A42B 3/0433; A44C 15/0015; F21V 33/0008
  USPC ...................................... 362/249.02; 340/540
  See application file for complete search history.

(56) References Cited

U.S. PATENT DOCUMENTS

| | | | |
|---|---|---|---|
| 5,461,188 A | 10/1995 | Drago et al. | |
| 5,575,554 A | 11/1996 | Guritz | |
| 6,243,870 B1 | 6/2001 | Graber | |
| 7,787,240 B2 | 8/2010 | Swain | |
| 7,815,343 B2 * | 10/2010 | Nii et al. | 362/311.03 |
| 8,370,965 B2 | 2/2013 | Lin et al. | |
| 2005/0099824 A1 * | 5/2005 | Dowling et al. | 362/572 |
| 2006/0028430 A1 | 2/2006 | Harary et al. | |
| 2006/0200889 A1 | 9/2006 | Newman | |
| 2006/0291193 A1 * | 12/2006 | Hill | 362/108 |
| 2007/0129005 A1 * | 6/2007 | Goldberg et al. | 455/3.06 |
| 2007/0199137 A1 | 8/2007 | Numes et al. | |
| 2009/0109660 A1 * | 4/2009 | Dutcher | 362/103 |
| 2011/0030120 A1 * | 2/2011 | Lin et al. | 2/97 |
| 2011/0074577 A1 * | 3/2011 | Zheng | 340/540 |
| 2012/0208596 A1 * | 8/2012 | Mullen | 455/557 |
| 2013/0033852 A1 | 2/2013 | Liao | |
| 2013/0077289 A1 | 3/2013 | Gridley | |
| 2013/0094189 A1 | 4/2013 | Kimitri | |
| 2013/0201653 A1 * | 8/2013 | Shoemake et al. | 362/3 |
| 2013/0286163 A1 * | 10/2013 | Dror et al. | 348/47 |
| 2014/0056172 A1 * | 2/2014 | Lee et al. | 370/254 |

FOREIGN PATENT DOCUMENTS

WO    WO2009088110 A    7/2009

* cited by examiner

*Primary Examiner* — Donald Raleigh
(74) *Attorney, Agent, or Firm* — Trojan Law Offices

(57) ABSTRACT

A lighting system mounted on an article of clothing. The light system comprises at least one illuminating wire mounted on the article. The illuminating wire is connected to a power source and a processing unit. The power source can be a solar strip. The processing unit is capable of analyzing the rhythm of music and commanding the illuminating object to flash based on the music. In some embodiments, the lighting system comprises a wireless receiver that can receive wireless signal such as Wi-Fi, Bluetooth, radio frequency, and voice command. The lighting effects of the lighting systems on different articles of clothing can be coordinated to form a special light show such as a light symphony.

16 Claims, 8 Drawing Sheets

LIGHTING SYSTEM FOR CLOTHING

FIELD OF THE INVENTION

This invention relates generally to a lighting system used on wearing apparel, and, more particularly, to jackets, pants, belts, badges, hats, shoes, and other clothing and accessories having, illuminating wires such as electroluminescent wires, multi-purpose optical display devices, and other electrical devices thereon and having solar cells to provide energy to the electrical components.

BACKGROUND

Lighting source, optical display devices, or other electrical devices on clothing are used to achieve different purposes. For example, adding illumination to a garment for its ornamental effect is used to enhance its fashionability. Lighting system is also used on clothing for outdoor enthusiasts and workers to enhance the wearers' visibleness during evening hours or early dawn hours. An optical display device can be mounted on a garment for advertising or expressing messages. Other uses of electrical devices on clothing include providing heat to warm the wearer.

Typically, these types of clothing are often powered by batteries or contain a power supply component with a notable weight. The additional weight often causes discomfort to the wearer. Thus, a small power source is often used to reduce the weight of the clothing. However, this severely limits the type of electrical devices that can be used on clothing and the hour of operation of the electrical devices. As a result, most clothing with electrical components only contains low power consuming devices such as light-emitting diodes (LEDs) or electroluminescent wire (EL wire).

Another problem of any clothing with electrical components is proper insulation. All electrical components must be waterproof so that water cannot enter and damage the electrical components during laundry. Poor insulation, especially after the electrical components being damaged by water, could cause electrical shock to the wearer. The insulation must include the power source. Yet, if the power source component is completely sealed, the wearer will not be able to replace the batteries. Designers of these types of clothing often encounter difficulties between providing the wearer a convenient way to replace the batteries and ensuring safety in insulating the electrical components.

Owing to the limits in providing power and managing the weight of the clothing, the electrical devices used on clothing are usually rather simple devices. A computerized or highly customizable electronic device is seldom mounted on a garment. Although there are garments that contain lighting source or optical display devices, existing garments do not utilize any digital devices to enhance the functionality of the garments. Conventional illuminated garments are largely designed to improve the appearance of the garments. A significant advancement would be a system or method for garments with electrical devices that would provide not only ornamental effects on the garments, but also means for information exchange and digital communication between the garments and other electronic devices in this digital age. Another significant advancement would be an insulated and washable garment with electrical devices that avoid the power and safety problems traditionally associated with electrical devices mounted on the garments.

SUMMARY

In view of the foregoing, the embodiments of the present invention is directed to special types of wearing apparels and accessories with electronic components such as electroluminescent wires, neon soft glow, LED, video display screen thereon. In some embodiments, the article of clothing comprises a solar strip that provides the power for the electronic components on it. The electroluminescent wires, neon soft glow, and/or LEDs on the clothing form a network of illuminating elements. The illuminating objects could serve aesthetic purposes. The electronic components can be controlled by some external sources. For example, the illuminating objects can flash or blink in some predetermined ways or based on music being played in the surrounding.

The article of clothing comprises a network of illuminating wires. The illuminating wires can be placed along the outline or the seams of the clothing so that it gives the clothing an outer frame that is glowing or flashing in the dark. The lighting source of the wiring can be made of electroluminescent wires, neon soft glows, LEDs, and optical fibers. In some embodiments, the skeleton frame is made of LED light sources couple with optical fibers. Different types of optical fibers can be used, such as regular optical fibers, fiber optic lanyards, strand side emitting fiber optic cables, solid core side emitting fiber optic cables. For a particular section of the skeleton frame, the section comprises a long optical fiber which defines the geometry and shape of the skeleton frame. When the LED lights are glowing, the light will pass along the optical fiber to glow the entire illuminating wire to give the effect of neon light soft glow. The LED lights of each illuminating wire can be of different colors. Since the LED lights are the light sources of the illuminating wire, the flashing of the wires can be controlled by the LED lights. The LED lights are wired to the solar strips as the power source and a processing unit to control the flashing of the LED lights. In other embodiments, electroluminescent wires, Lumamedia® lighting, or other electroluminescence materials can be used for the illuminating wires. Since the entire wire of these electroluminescence materials glows with electrical current passing through the wire, no separate LED lights are required at each end of the electroluminescence wire. The flashing of these wires are directly controlled by the processing unit.

In some embodiments, the article of clothing comprises at least one solar strip located on a relatively top position of the article for better light exposure. The size of the solar strip depends on the power required to support the electronic components and the desired duration of operation for the lighting system. Multiple solar strips may also be used. The solar strips are made of flexible organic photovoltaic cells or other flexible polymer solar cell that uses organic electronics. Preferably, the solar strips will contain both photovoltaic cells and solar thermal collectors. Thus, not only can the solar strips be charged by light, but they can also absorb heat from dryers to store thermal energy. The solar strip is also washable and dryable.

The illuminating wires with all of the electronic components will be dipped in a clear plastic chemical so that a layer of transparent plastic will wrap around the electronic components. Through the coating and protection of the plastic, the illuminating wires will be waterproof and be able to withstand extreme temperature.

The embodiments of the present invention further comprises a processing unit and a control panel that can be programmed to control the lighting system. The lighting system can be programmed to perform different modes or patterns such as light on and off, solid light, simulating heartbeat, strobe, dimming in and out, and the rhythmic beat pattern of music. For example, the computer chip can be pre-programmed to control the flashing of the LEDs so that an artist can design the flashing pattern of the illuminating wires in accordance with his artistic value and music that matches the style and pattern of the flashing. The processing unit can also instantly analyze the rhythm of the music being played and direct the lighting system to flash accordingly. Thus, the flashing pattern of the light system can be synchronized with music being played. A group of people wearing similar clothing of the embodiments of the present invention can coordinate the lighting system to flash to create a light symphony. In some embodiments, the lighting system also comprises a wireless receiver that can receive wireless signal such as Wi-Fi, Bluetooth, radio frequency, and voice command. Thus, the command or any music being played can be sent to the processing unit instantly to control the lighting system.

In some embodiment of the invention, the clothing further comprises an organic flexible video display or other types of electronic screens. The videos being played on the display can be associated with the pattern of the lighting system. The receiver in the control panel can receive wireless signal such as Wi-Fi, Bluetooth, mobile phone signals, and radio frequency. This allow the display to have a video streaming feature videos by receiving videos from external sources, such as cell phones or computers. This allows online videos such as YouTube videos to be played on the display.

DETAILED DESCRIPTION OF EMBODIMENTS

The following description is made for the purpose of illustrating the general principles of the invention and should not be taken in a limiting sense. The scope of the invention is best determined by reference to the appended claims.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

Figure 1:
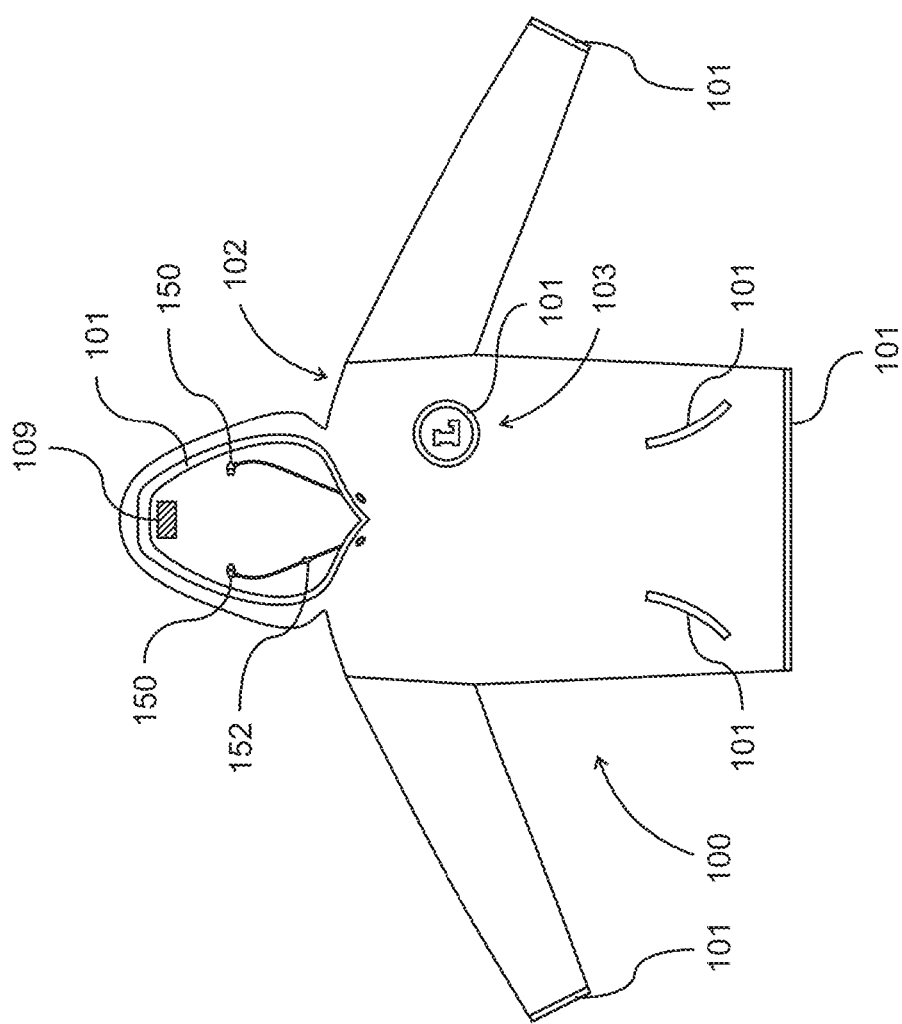
FIG. 1 is a front view of an article of clothing, namely a hooded sweatshirt, in accordance with an embodiment of the present invention.

Referring now to FIG. 1, a lighting system 100 is mounted on an article of clothing 102. The lighting system 100 includes one or more than one illuminating wires 101 forming a network of soft glow wires. In some embodiments, the network of illuminating wires 101 can be placed along the outline or the seams of the article of clothing 102 so that it gives the article of clothing 102 an outer frame that is glowing or flashing in the dark. Other exemplary placements of the illuminating wires 101 include, but are not limited to, along a top, bottom, front, rear and/pr side surfaces of the article of clothing 102. The network of illuminating wires 101 can be made for any size or pattern for any article of clothing of men, women, children and pets. The illuminating wires 101 can emit light along the entire length of them. They can also emit light in an intermittent way or change color at different time interval or continuously. Each of the illuminating wires 101 can be of different colors and can flash with different frequencies and patterns.

Although the term illuminating wire is used in this specification, it is known that other lighting or illuminating objects can be used to replace the illuminating wires 101 for the lighting or flashing effects disclosed in this specification. The illuminating objects can be of any size, shape, and color.

In FIG. 1, the article of clothing 102 is a hoodie or a hooded sweatshirt. The lighting system 100 includes a first illuminating wire 101 that is arranged to run along the circumference of the hood, a second and a third illuminating wires 101 along the right and left sleeves, a fourth and fifth illuminating wires 101 along the opening of the left and right pockets, and a sixth illuminating wire 101 at the bottom of the hooded sweatshirt 102. The logo 103 on the chest area of the hooded sweatshirt 102 can also be surrounded by another illuminating wire 101 or the entire logo 103 is a light source itself that is connected to a power source 108. The arrangement of the network of illuminating wires 101 in this particular figure is for illustration only. Any other number of wires used, placements and arrangements of the network of illuminating wires 101 are possible.

Figure 2:
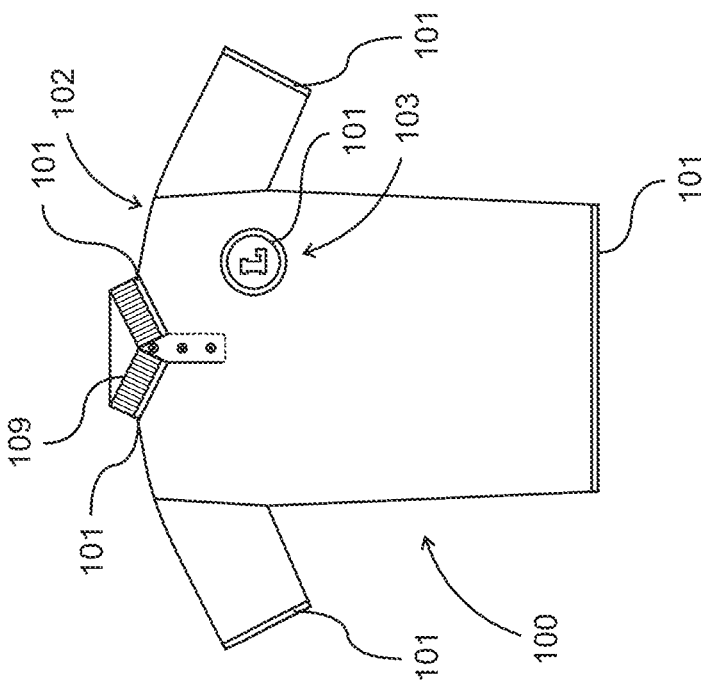
FIG. 2 is a front view of an article of clothing, namely a shirt, in accordance with another embodiment of the present invention.

Referring to FIG. 2, the article of clothing 102 is now a shirt. In this figure, the lighting system 100 includes a first illuminating wire 101 along the collar of the shirt, a second and a third illuminating wires 101 along the right and left sleeves, a fourth illuminating wire at the bottom of the shirt 102. Again, the shirt 102 has a logo 103 at the chest area of the shirt 102 that can be surrounded by another illuminating wire 101 or the entire logo 103 is a light source itself that is connected to a power source 108.

Figure 3:
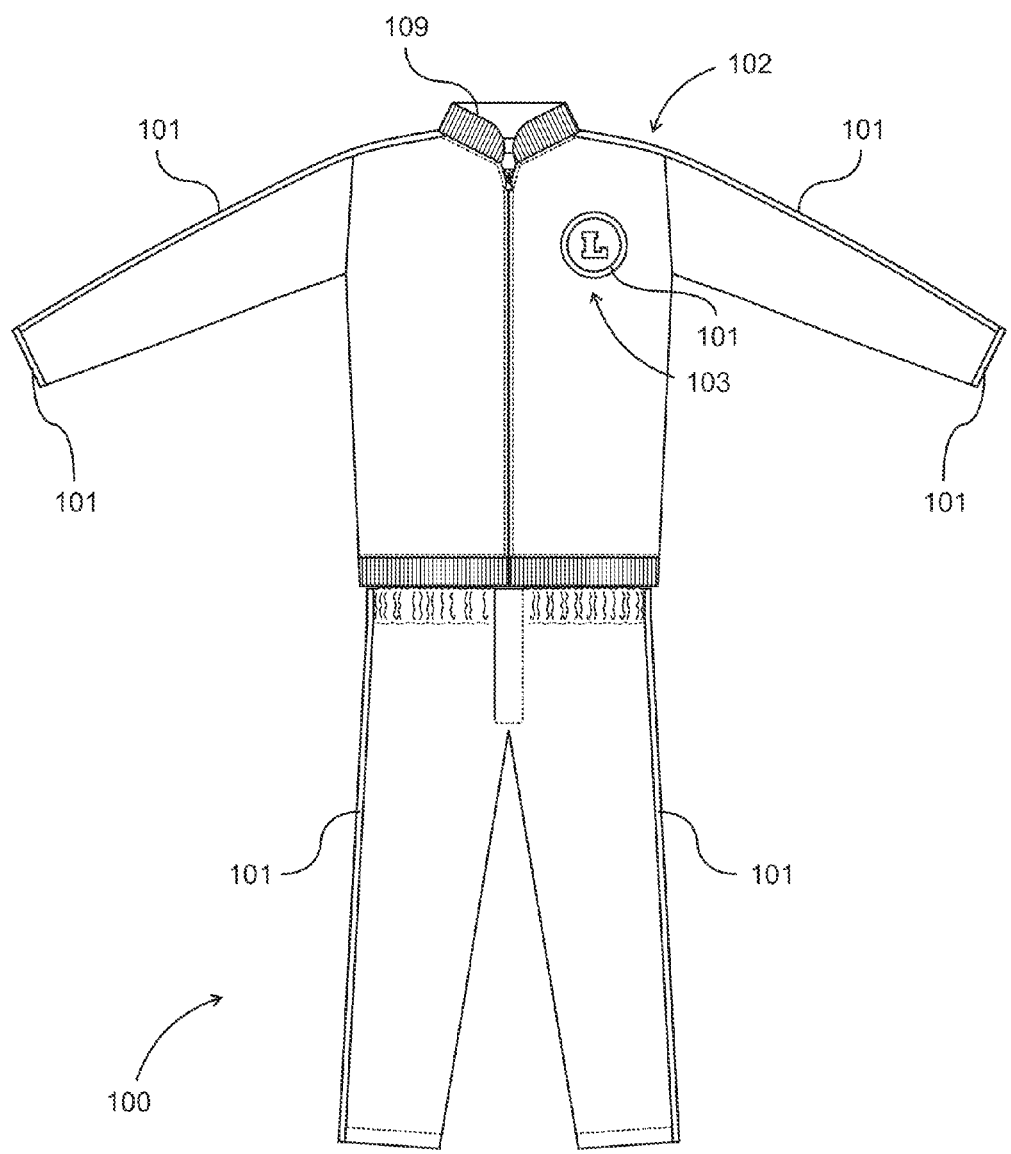
FIG. 3 is a front view of an article of clothing, namely a jumpsuit, in accordance with yet another embodiment of the present invention.

Referring now to FIG. 3, the article of clothing 102 is now a jumpsuit. The jumpsuit 102 also contains a lighting logo 103 and a network of illuminating wires 101 forming the lighting system 100. The illumining wires 101 run along the outline or the seams of the jumpsuit and the right and left sleeves.

Figure 4:
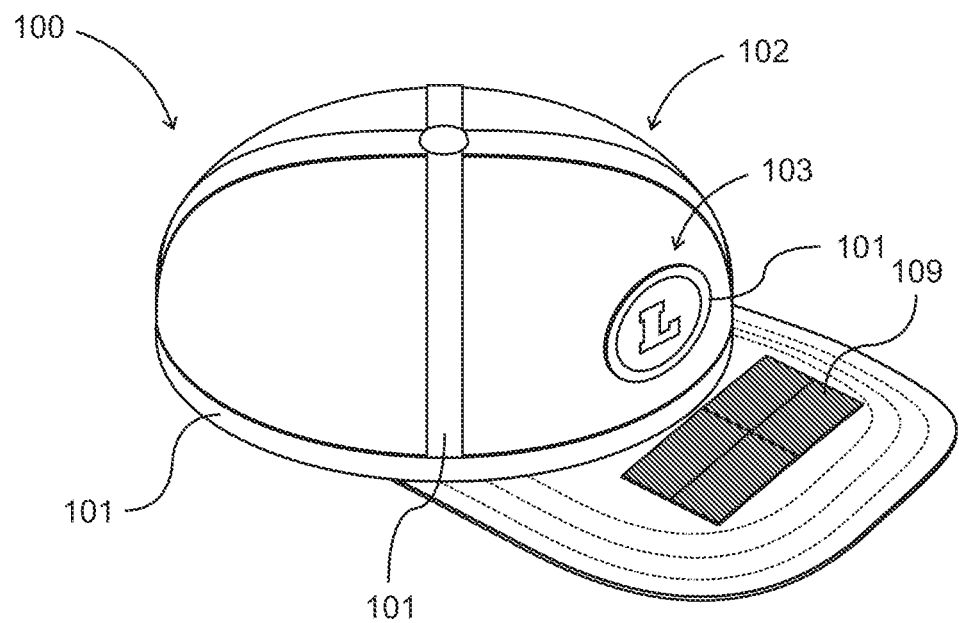
FIG. 4 is a front view of an article of clothing, namely a hat, in accordance with yet another embodiment of the present invention.
Figure 5:
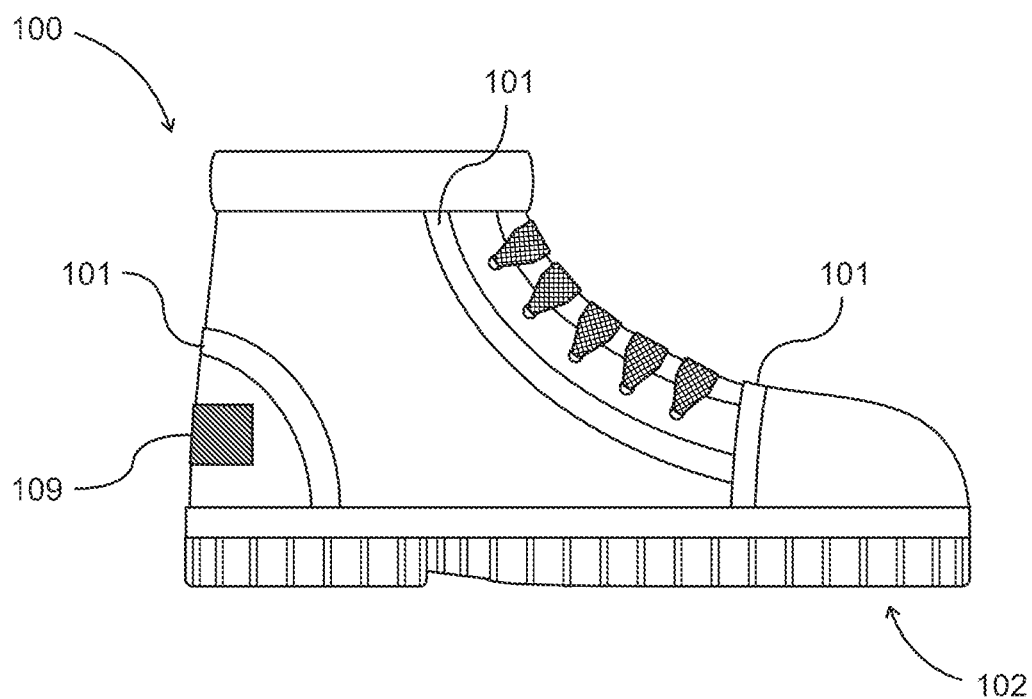
FIG. 5 is a front view of an article of clothing, namely a shoe, in accordance with yet another embodiment of the present invention.

The article of clothing 102 can also be a hat or a shoe, as illustrated in FIG. 4 and FIG. 5. The network of illuminating wires 101 can be arranged and placed on the seams of the hat or the shoe. A lighting logo 103 can also be present on the hat or the shoe.

Figures 6A, 6B:
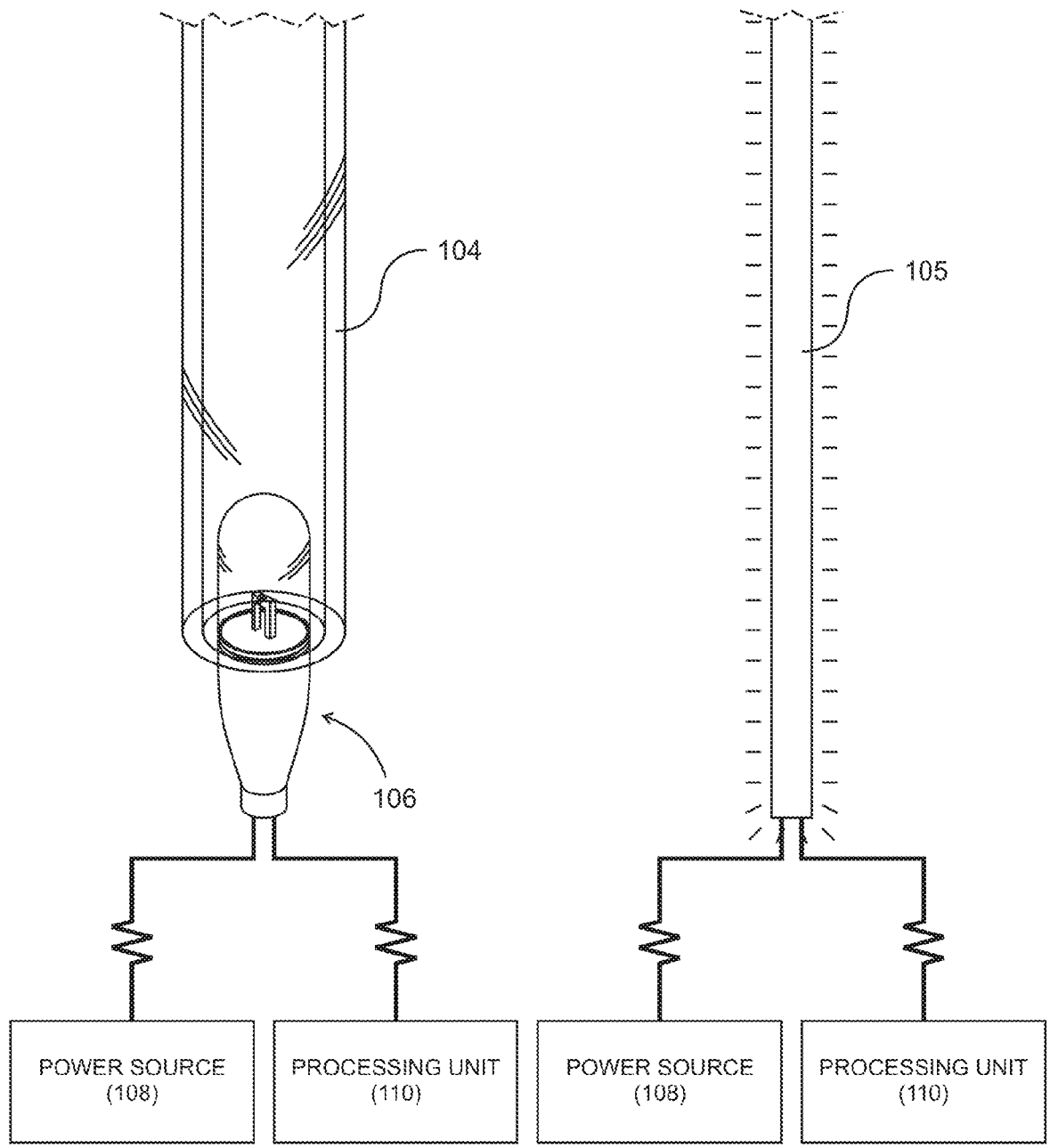
FIG. 6A is an enlarged view of an illuminating wire in accordance with an embodiment of the present invention.
FIG. 6B is an enlarged view of another illuminating wire in accordance with another embodiment of the present invention.

Referring to FIG. 6A, at least two alternative ways can be used to make the illuminating wires 101. In some embodiments, a transparent or translucent piping 104 is couple with at least one light source 106 to form an illuminating wire 101. The light source 106 could be a small light bulb, light emitting diode (LED), or color changing LED. The translucent piping 104 can be made of different materials such as optical fibers or translucent plastic tube. Different types of optical fibers can be used, such as regular optical fibers, fiber optic lanyards, strand side emitting fiber optic cables, sold core side emitting fiber optic cable. The light source 106 is arranged to emit light into the translucent piping 104. The light sources 106 can be arranged at each end of the translucent piping 104 or at only one end of the translucent piping 104 if the translucent piping 104 is linear, such as the one used in the illumining wire 101 in FIG. 6A that runs along the collar of the shirt 102. The translucent piping 104 can also be circular, such as the one used in the illumining wire 101 in FIG. 1A that runs along the sleeve of the hoodie 102. In this case, one light source 106 or two light sources 106 pointing in opposite direction are placed at the connection point of the circular piping 104. When the light courses 106 are glowing, the light will pass along the translucent piping 104 to glow the entire transparent or translucent piping 104 to give the effect of neon light soft glow. Although the piping 104 itself does not glow or emit any light without a light source, it could determine the color of the light glow along it. The color of the light glowed from the piping 104 will be the same or similar to the color of the piping 104. Alternatively, the color of the light emitted can also be control by the color of the light sources 106. The light emitting or flashing of the illuminating wires 101 is based on the light sources 106. The light sources 106 are connected to a power source 108 and processing unit 110 for power supply and the control of the flashing pattern, including color changing, of the lighting system 100.

Referring to FIG. 6B, in other embodiments of the present invention, instead of coupling translucent piping 104 and light sources 106, a electroluminescence wire 105, Lumamedia® lighting, or other electroluminescence materials can be used as the illuminating wires 101. Electroluminescence wires are materials that emit light when electricity passes through the wires. Since the entire wires glow, no separate light source 106 is required at the end of the electroluminescence wires. The wires are directly connected to the power source 108 and processing unit 110 for power supply and the control of the flashing pattern, including color changing, of the lighting system 100.

While only two exemplary embodiments of making the illuminating wires 101 are disclosed here, the illuminating wires 101 can be made by any other means known in the art.

Figure 7A:
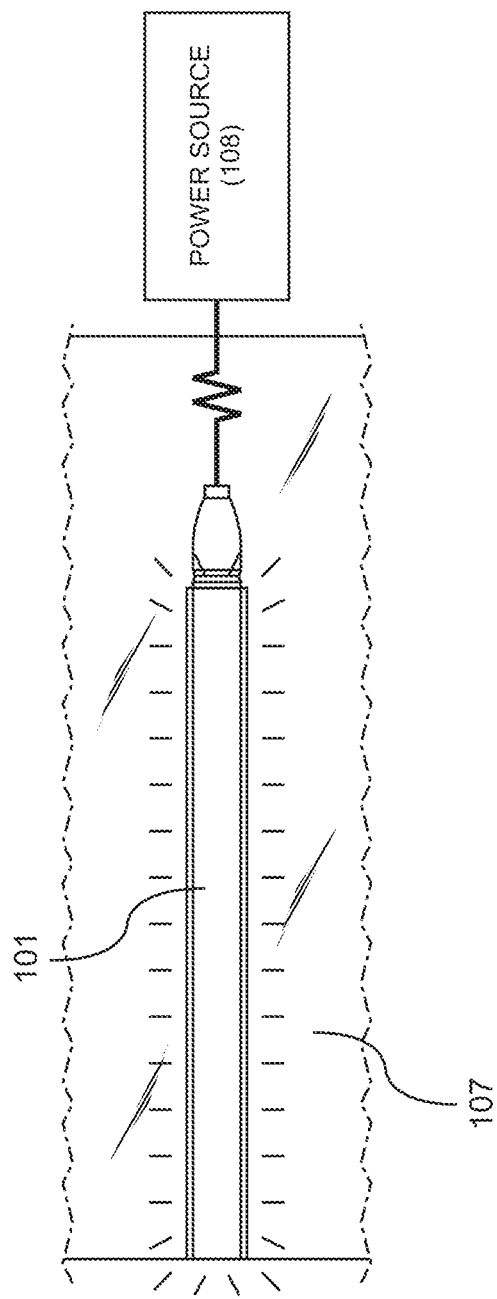
FIG. 7A is an enlarged top view of an illuminating wire wrapped by plastic cover in accordance with an embodiment of the present invention.
Figure 7B:
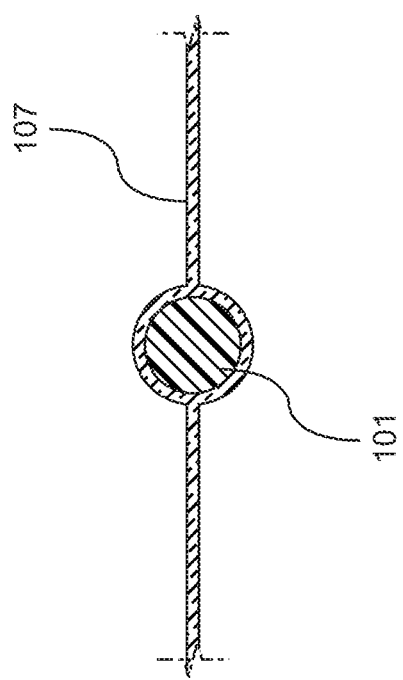
FIG. 7B is a cross-sectional view of the illuminating wire shown in FIG. 7B wrapped by plastic cover in accordance with an embodiment of the present invention.

Referring now to FIG. 7A and FIG. 7B, the illuminating wires 101 must be properly insulated to make the article of clothing 102 washable. The insulation also prevents the chance of the wearer from being shocked by electricity. The illuminating wire 101 is connected to the power source 108 and the processing unit 110. All electronic components are dipped in a protective material such as clear plastic chemical or any materials that can withstand extended wear, washing and drying and provide insulation to the lighting system 100.

For example, when clear plastic chemical is used, a layer of transparent plastic 107 will wrap around the illuminating wires 101 and the electronic components. With the protection of the plastic insulation layer, the lighting system 100 will be waterproof and be able to withstand extreme temperature.

Now refer back to FIGS. 1, 2, 3, 4, and 5, which show different articles of clothing 102 in different embodiments of the present invention. The lighting system 100 also includes a power source 108 that is connected to all electronic components and illuminating wires 101. In preferred embodiments, the power source 108 comprises at least one solar strip 109 located at a relatively top position on the article of clothing 102 for better light exposure and a battery that is electrically connected to the solar strip 109. For example, in FIG. 1, the solar strip 109 is located on the hood of the hoodie 102. In FIG. 2, the solar strip 109 is located at the collar area of the shirt 102. In FIG. 4, the solar strip 109 is located on the visor of the hat 102. The size of the solar strip depends on the power required to support the electronic components and the desired duration of operation of the lighting system. Multiple solar strips may also be used.

The solar strip 109 can be made of flexible organic photovoltaic cells or other flexible polymer solar cells that use organic electronics. Preferably, the solar strip 109 will contain both photovoltaic cells and solar thermal collectors. The photovoltaic cells absorb sunlight and convert it into electrical power. The solar thermal collectors absorb heat from dryers to store thermal energy. The solar strip 109 provides electrical energy to the battery so that the lighting system 100 can be recharged by sunlight exposure and by being dried in a dryer. Since the power source 108 contains both the solar strip 109 to absorb and convert energy and a battery to store energy, the power source 108 is capable of directly supplying power to the lighting system 100 when the lighting system 100 is in use and storing energy for future use when the lighting system 100 is turned off. By using organic electronics, the solar strip 109 is washable and dryable. The battery and the electrical wire that connects the solar strip 109 to the battery are properly insulated to eliminate the chance of the wearer being shocked by electricity. For further safety, the battery can be maintained under 12 volts. Since the battery is rechargeable by the solar strips 109, the wearer of the clothing 102 is not required to replace the battery located in the lighting system 100. Thus, the battery can be completely sealed and insulated from potential water damage when the article of clothing 102 is being washed. The insulation of the battery and the related electrical components can be achieved by using plastic wrapping as discussed above or other means known in the art.

In some embodiments, the battery of the power source 108 can be recharged by different wireless means. In additional to using solar or thermal energy to recharge it, the power source 108 can also be recharged by wireless inductive charging. A charger pad that creates an electromagnetic field sends energy through an inductive coupling to the battery of the power source 108. Thus, the article of clothing 102 can simply be placed on the charger pad to recharge through inductive charging. Inductive charging has a low risk of electrical stock and is particularly suitable for the use in the article of clothing 102. Since inductive charging sends energy wirelessly through an electromagnetic field, the power source 108 and the battery can be completely insulated. No external wire is required in these embodiments, providing additional safety to the wearer by reducing the risk of electrical stock through proper insulation. The source of the energy for the charger pad can include renewable sources such as a solar cell.

Although the power sources 108 in most articles of clothing 102 are completed insulated and the battery are recharged via different wireless means, the articles of clothing 102 in some embodiments can contain a power inlet and an electrical wire so that the power source 108 can be charged by conventional conductive electricity. This is used when the lighting system 100 contains more complicated electrical components and requires a large amount of electricity to operate.

Figure 8:
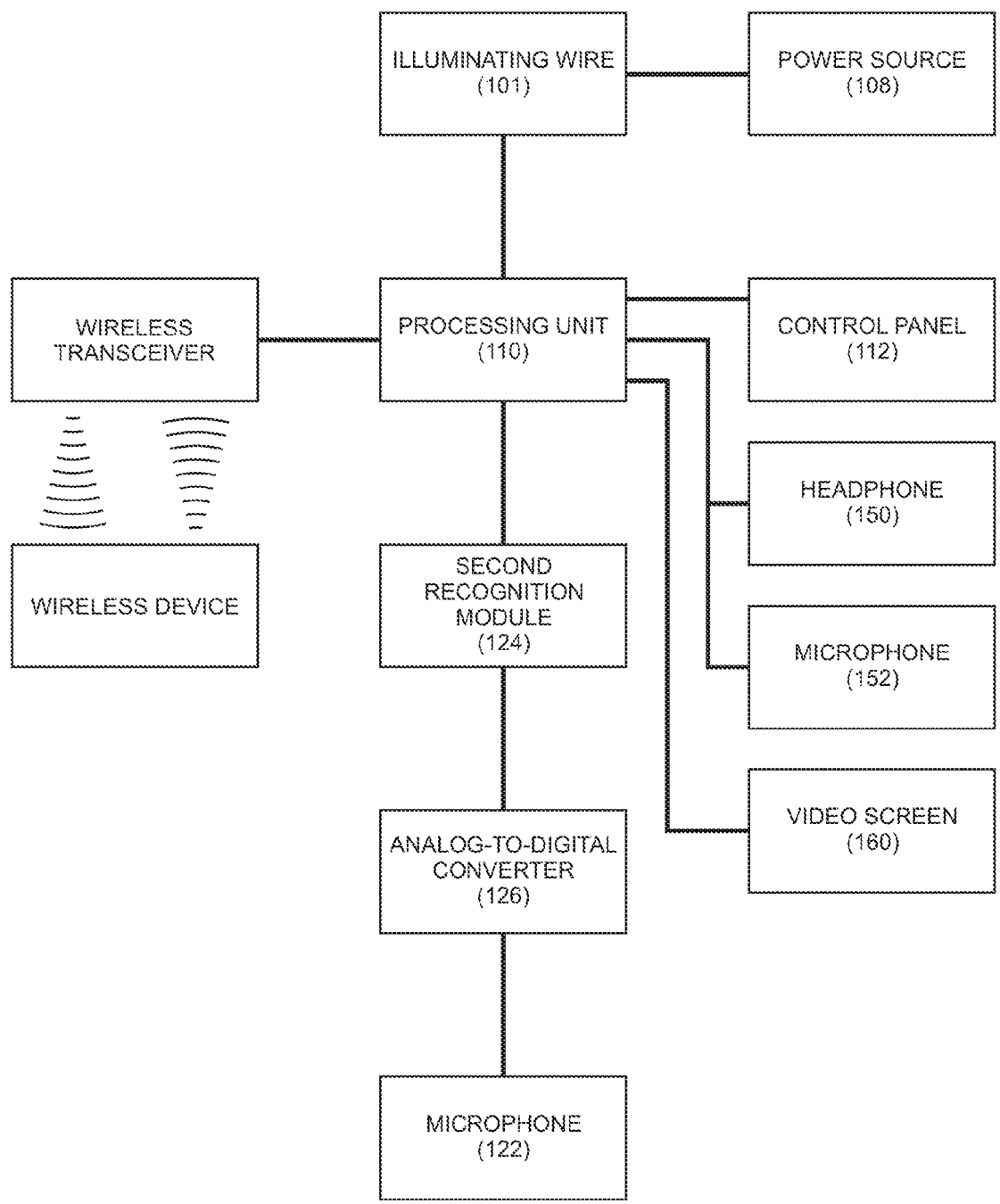
FIG. 8 is a block diagram of a lighting system in accordance with an embodiment of the present invention.

Now referring to FIG. 8, some embodiments of the present invention have a lighting system 100 that contains a processing unit 110, which could be a microcontroller, a central processing unit, or any processing unit, and a control panel 112 that contains buttons for the wearer to control the lighting system 100. The lighting system 100 can be controlled by regular buttons on the panel or other means such as voice command as discussed in further detail below. The control panel 112 is connected to the processing unit 110 for the input of command to the processing unit 110. The processing unit 110 is connected to all other electronic components of the lighting system 100. As a result of the processing unit 110, the lighting system 100 can be programmed to perform different modes or patterns such as light on or off, solid light, and diming in and out. The lighting system 100 can also simulate other patterns such as heartbeat and strobe.

In some embodiments of the present invention, the lighting system 100, through the control of processing unit 110, can perform flashing, including changing color, according to the rhythm of music, such as the rhythmic beat pattern of the music. For example, the processing unit 110 can be pre-programmed to control the flashing of the lighting system 100 in accordance with the design of an artist. The artist can record and decide the light on or off, the frequency, and the change of color of the illuminating wires 101 for the duration of the music. When the music is played, the wearer of the article of clothing 102 can turn on the flashing of the lighting system 100 and select the pre-programmed flashing pattern using the control panel 112. As a result, the lighting system will flash based on the rhythm of the music being played.

In some preferred embodiments of the present invention, the lighting system 100 also contains a transceiver 114 that receive signals, digital or analog, from other electronic devices and transmit the signals to the processing unit 110 for analysis. The transceiver 114 can comprises a transmitter and a receiver for transmitting and receiving signals. The receiver of the transceiver 114 can be a microphone that receives sound for voice command and music being played in the surrounding as input signals. The transceiver 114 can also comprise a wireless receiver that receives wireless signals such as Wi-Fi, Bluetooth and radio frequency.

In some embodiments, the lighting system 100 can be controlled by voice commands. In the lighting system 100 that is equipped with voice or sound recognition functionality, it contains a sound recognition interface 120. The sound recognition interface 120 comprises a microphone 122 and a sound recognition module 124, and an analog to digital converter 126. The microphone 122 can be located anywhere on the article of clothing 102 but preferably at the upper part of the clothing so that a wearer can make a voice command easily. The microphone 122 is connected to the analog to digital converter 126. The microphone 122 is adapted to receive voice in the normal range of human hearing from approximately 20 Hz to 20 kHz and transduce the sound to analog signals in a manner known in the art. Once the transduction is completed, the microphone sends the corresponding analog signals to analog to digital converter 126 as inputs. The analog to digital converter 126 converts the analog signals to digital signals and transmits the digital signals to the sound recognition interface. The sound recognition module 124 contains a memory to store digitized sound patterns. Upon receiving the digital signals from the analog to digital converter 126, the sound recognition module 124 compares the digitized audio patterns to the stored voice patterns in the memory. When the sound recognition module 124 recognizes a match between the input digitized audio pattern and the stored voice patterns, the sound recognition module 124 sends a command signal to the processing unit 110. The processing unit 110 will then control the lighting system according to the voice command of the wearer.

The illuminating wires 101 can be used to indicate the status of the control, such as the status of voice command, of the lighting system 100. For example, in FIG. 1, the illuminating wires 101 that run along the sleeves of the article of clothing 102 can indicate such status. When the sound recognition module 124 cannot find a match for the voice command signal, the sound recognition module 124 can send a command signal to the processing unit 110 to indicate that no proper command is found. Consequently, the processing unit 110 can order the illuminating wires 101 that run along the sleeves to flash red light. Similarly, when the sound recognition module 124 finds a match for the voice command signal, the processing unit 110 initiates a command to the lighting system 100. If the illuminating wires 101 that run along the sleeves of the article of clothing 102 are not in use for the initiated command, the processing unit 110 will direct the illuminating wires 101 to turn green to indicate a proper voice command has been received.

In addition to recognizing voice commands, the sound recognition interface 120 can analyze signals of music that is being played in the surrounding environment. When music is being played, the microphone 122 receives continuous music and transduces the music to analog signals. The analog signals either are converted to digital signals by the analog to digital converter 126 and transmitted to the processing unit 110 or are directly transmitted to the processing unit 110. In either situation, the music signals are not required to be transmitted to the sound recognition module 124 to seek a potential match. After the processing unit 110 receives the music signals, the program in the processing unit 110 analyzes the rhythmic beat and the pitch of the music. The processing unit 110 then commands the lighting system 100 to flash with a frequency, pattern, and intensity based on the rhythm and the pitch of the music. Thus, the processing unit 110 can instantly analyze the music currently being played in the surrounding and instantly command the lighting system 100 to flash accordingly. The processing unit 110 can also store the rhythm and the analysis result in memory and can command the lighting system 100 to flash accordingly in the future.

Using the feature of instant analysis of music being played in the surrounding helps the lighting system 100 to better synchronize the pre-programmed or any stored flash pattern with the music. For any stored flash pattern, the wearer of the article of clothing 102 can start the flashing pattern when the particular song on which the pattern is based has started. Although the flash pattern is pre-programmed to flash in accordance to the rhythm of that particular song, the lighting system 100 may not synchronize the flashing with the beat of the song perfectly due to various reasons such as human error when the wearer manually starts the lighting system 100. For the embodiments that the lighting systems 100 are capable of analyzing instantly the music being played, the processing unit 110 can analyze the timing and progress of the music being played. When the wearer started the lighting system 100, the processing unit will match the timing of the flashing with the progress of the song. Thus, the flashing is synchronized with the song.

In some embodiments, the lighting system 100 also comprises a wireless receiver that can receive wireless signal such as Wi-Fi, Bluetooth and radio frequency. The wearers of the articles of clothing 102 can control the lighting system via their smartphone, computer, portable music player and other wireless devices. The wearers can send music to the lighting system 100 directly through their wireless devices. The processing unit 110 then analyzes the rhythmic beat and the pitch of the music and commands the light system 100 to flash with a frequency, rhythm and intensity based on the music. The wearer can also send pre-programmed pattern to the lighting system 100 to direct the lighting system 100 to flash in such pattern. In some embodiments, the lighting system 100 also contains memory that allows the wearer to store music in the lighting system. The processing unit 110 can analyze the music saved in the memory and direct the lighting system 100 to flash according to the frequency, rhythm and intensity of the music.

Figure 10:
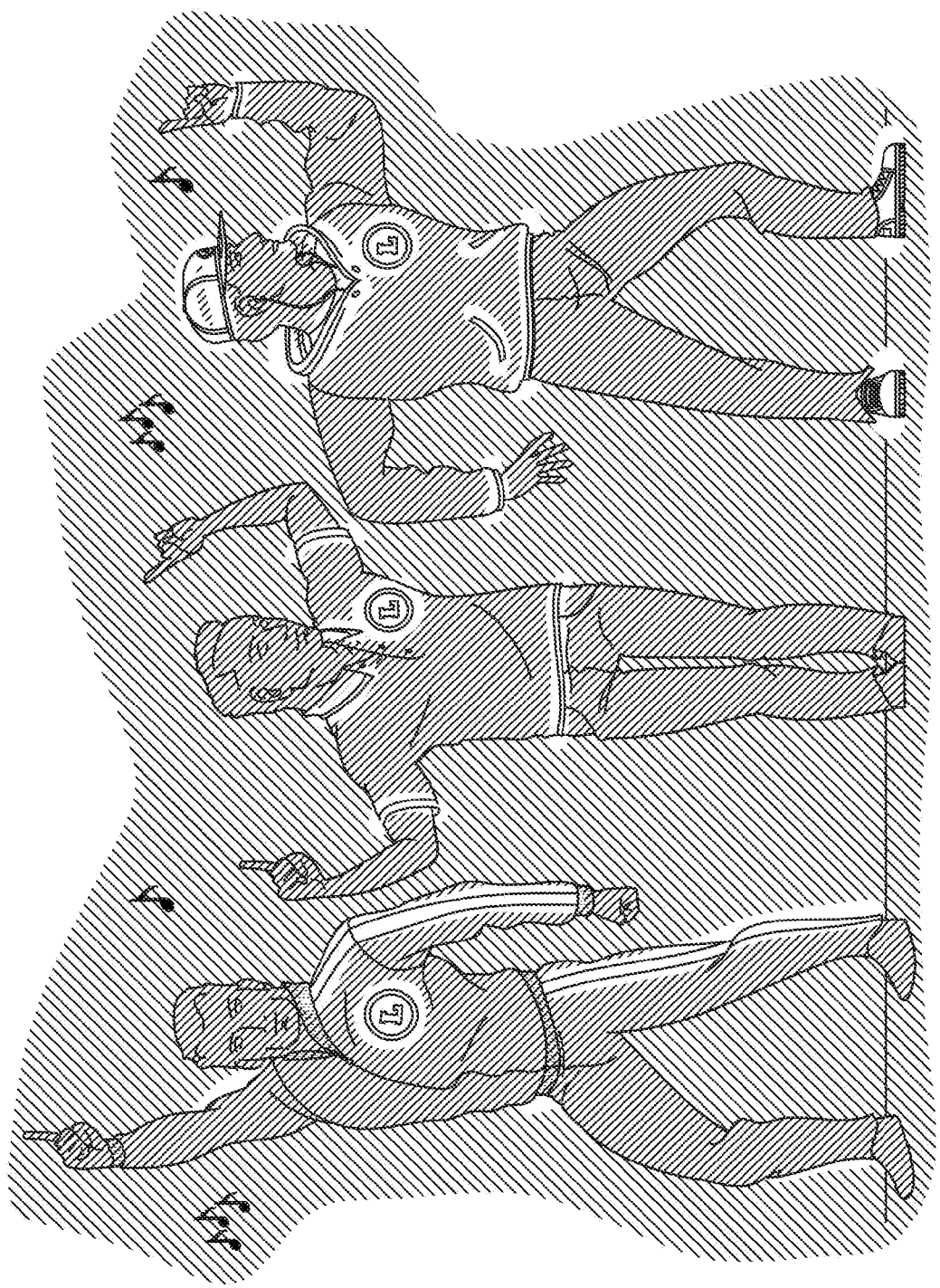
FIG. 10 is a diagram showing several persons wearing different articles of clothing dancing in accordance with some embodiments of the present invention.

In some preferred embodiments, since the lighting system 100 can instantly analyze the rhythm of the music being played in the surrounding or it can be controlled by wireless devices through wireless signals such as Wi-Fi, Bluetooth and radio frequency, different articles of clothing 102 can communicate wirelessly to coordinate the flash pattern. This type of coordinated flashing of different lighting systems of a plurality of articles of clothing and the combination of light effect are illustrated in FIG. 10. It is understood that the lighting systems 100 can be mounted on different articles of clothing 102. For example, some people can be wearing the hoodies shown in FIG. 1 while others are wearing the shirts shown FIG. 2. Some people may only be wearing the hats or shoes shown in FIGS. 1D and 1E. The articles of clothing 102 are not required to be identical to coordinate the light effects with other articles of clothing 102.

The wearers of the article of clothing 102 with the lighting system 100 can make a special performance using the lighting effect of the embodiments of present invention. For example, a person may wear a jacket with the lighting system 100 and dance with the special lighting effect that is synchronized with the music and the dance. This opens different possibilities for dancing performers to design special effects in their dancing performance. Singers in concerts can also use the lighting system 100 and the synchronization feature to interact with their audience.

In one exemplary situation, all lighting systems 100 on different articles of clothing 102 are synchronized to flash with the same pattern simultaneously. Thus, when a group of people wears different articles of clothing 102 in a room, they can synchronize the flash pattern of their articles of clothing 102 to create a light show. For example, in a music concert, a group of audience can command the lighting systems 100 to perform the instant analysis of music, the lighting systems 100 in different articles of clothing 102 will perform the same task to analyze the same music being played. Based on the same music currently being played, all lighting systems 100 will flash in the same manner and pattern at the same time. Thus, all lighting systems 100 will be synchronized. Alternatively, the organizer of the concert can control and coordinate the flashing of different lighting systems 100 worn by the audience. The lighting systems 100 have wireless communication capacity that allows the lighting systems 100 to be controlled by a single wireless device. The organizer, such as a disc jockey, can use the wireless device to send music signals or command signals to the lighting systems 100 worn by the audience. As a result, all lighting systems 100 in the concert can flash in the same way based on the common music or command signals transmitted from the single wireless device and the lighting systems 100 will be synchronized to perform a special light show. This creates a unique atmosphere and character to the concert. The organizer can also send different music signals or command signals to different groups of audience. For example, the lighting systems 100 worn by the audience in the east wing of the auditorium can flash in a different way of those in the west wing of the auditorium, creating a shape contrast in the auditorium. Sometimes the lighting systems 100 of a section of audience are completely darkened, while those in other sections are illuminating without flashing. The change of the lighting effect in different sections of the audience can create different audience wave patterns similar to the wave created by the audience in a stadium in a sport event. Similar ideas can be applied to other occasions such as partying in a nightclub.

In other exemplary situations, different music or command signals are sent to different lighting systems 100 to create different flashing patterns simultaneously, while different flashing patterns are coordinated in some special combinations to form a special light symphony. For example, the instrumentalists in an orchestra can wear the articles of clothing 102. The lighting systems 100 have wireless communication capacity that allows the lighting systems 100 to be controlled by a single wireless device. A person in the orchestra can use the wireless device to command the lighting systems 100 on different instrumentalists to flash based on different music being played by different instruments. The lighting systems 100 on a group of violinists will be flashing based on the music being played by the violins while the lighting systems 100 on a group of woodwind instrumentalists will be flashing based on the music being played by the woodwind. As such, the light show formed by the coordination of different flashing pattern integrates with the music of the orchestra to create a special light and music symphony.

In some embodiments, the lighting system 100 contains a wireless transmitter that allows the lighting system 100 to send wireless commands to other wireless devices through wireless protocol such as Wi-Fi, Bluetooth and radio frequency. The coordination among the lighting systems 100 on different articles of clothing 102 can be achieved by initiating a command from one of the lighting systems 100 and transmit the command to other lighting systems 100. A leader in a room wearing the article of clothing 102 with the lighting system 100 can control the flashing and lighting of the clothing of other wearers. The control of the lighting can be carried out automatically based on a program installed in the processing unit 110 or manually by the leader. The wearers of the embodiments of the present invention can follow a person's dance and the lighting will add special effect to the dance. For example, in a music concert, the singer on the stage can wearing the embodiment of the present invention can control the lighting effect of the audience. The audience can then follow the music or the dance of the singer. The articles of clothing they are wearing will flash based on the singer's dance and songs and add a unique lighting effect to the event.

In some embodiments, the article of clothing 102 also contains waterproof headphones and microphone. For example, in FIG. 1, the waterproof headphones 150 are located inside the hood of the article of clothing 102. The microphone 152 is located below one of the headphones 150 on the left. The microphone 152 is adapted to receive voice command or the sound of music. The article of clothing 102 is adapted to communicate with other wireless devices. When music is being played, the music is transmitted to the lighting system 100. The wearer of the article of clothing 102 can thus listen to the song through the waterproof headphones 150. In some embodiments, the lighting system 100 also contains memory that allows the wearer to store songs in the lighting system 100. The wearer can listen to the songs through headphones 150 while the processing unit 110 analyzes the songs saved in the memory and direct the lighting system 100 to flash according to the rhythm of the music. The wearer can also send the song to other people who wear other articles of clothing 102 so that different lighting systems 100 can coordinate to flash together in the manners described above.

The wearers of articles of clothing 102 equipped with headphones 150 and Bluetooth connection can pair the lighting system 102 with their cell phones. When a cell phone is connected to the lighting system 102, the wearer can use the lighting system to have phone conversation through the headphones 150 and microphone 152. The illuminating wires 101 can be used to signal incoming calls. For example, in FIG. 1, the illuminating wires 101 that run along the sleeves of the article of clothing 102 will flash red for the duration of an incoming call. When the phone is paired with the lighting system 100, the phone will send a wireless signal through Bluetooth to the wireless receiver of the lighting system 100. Consequently, the processing unit 110 will analyze the signal and command only the illuminating wires 101 that run along the sleeves of the article of clothing 102 to flash red until the incoming call is picked up by the wearer or the call is terminated. As such, the lighting system can give the wearer a visualization of incoming call signal through the flashing of the illuminating wires.

Figure 9:
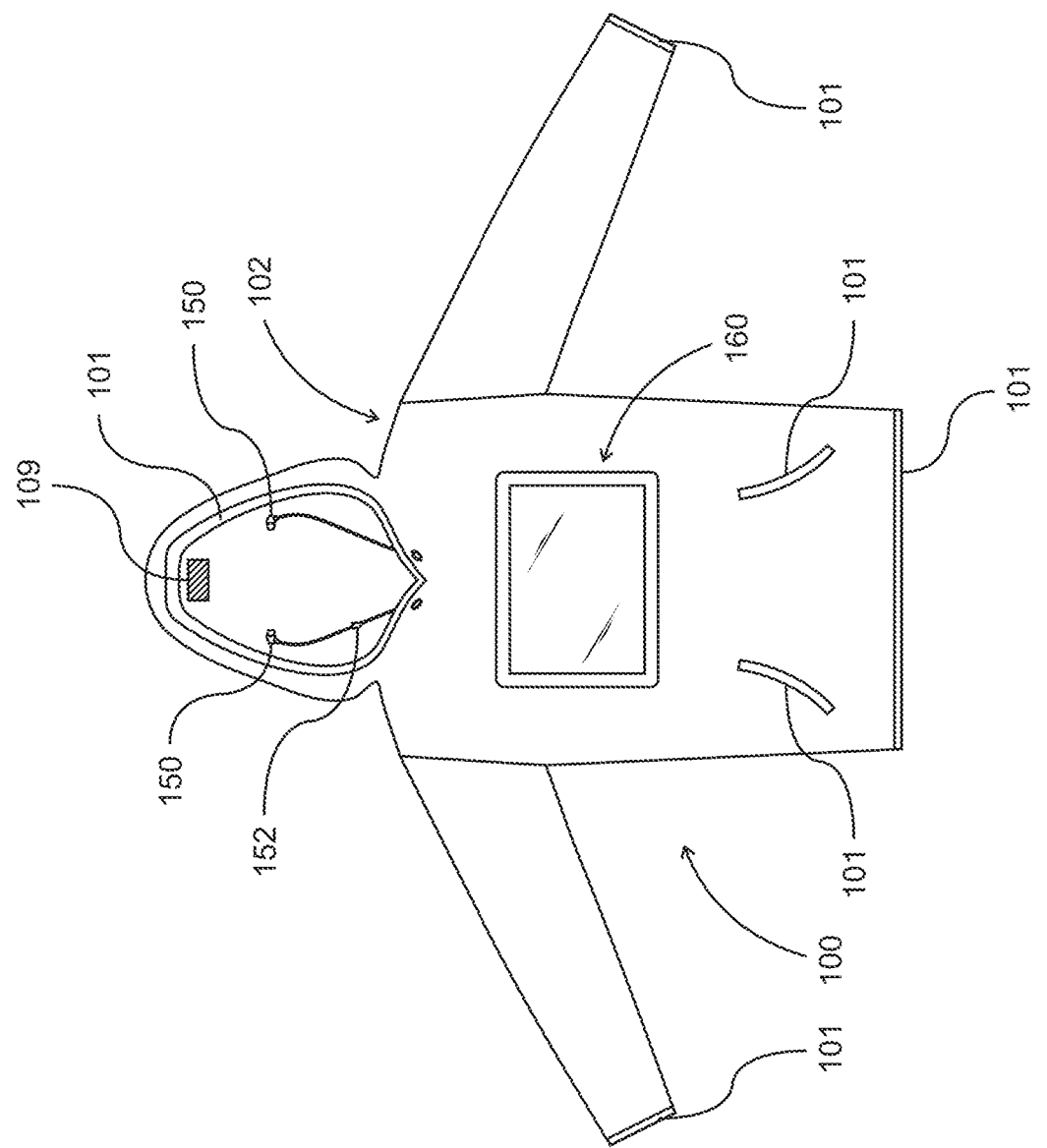
FIG. 9 is a front view of an article of clothing with a video display in accordance with an embodiment of the present invention.

Referring now to FIG. 9, the article of clothing 102 with the lighting system 100 additionally comprises a video screen 160 at the chest area of it. The article of clothing 102 includes reinforced material, such as stitched material, fasteners or other methods, to maintain the video screen 160 in a fixed position. The video screen 160 can be secured at any location on the article of clothing 102, including the chest, sleeves, lower torso, or back. The video screen 160 can be of any size. The video screen 160 can be made of flexible organic material or any material known in the art, including liquid crystal display LCD. The video screen 160 can optionally coupled to the headphones 150 and microphone 152 or incorporating separate speakers. The video screen 160 is also powered by the power source 108.

The video screen 160 is connected to the wireless transceiver that communicates with other wireless devices through wireless protocol such as Wi-Fi, Bluetooth, and radio frequency. When a song is transmitted to the lighting system 100 through the wireless transceiver, the video screen 160 plays the music video of the song in synchrony with the song. Thus, the people around the wearer of the article of clothing 102 can view the music video with the special flashing effect of the lighting system 100. If a music video is not available, the processing unit 100 can analyze the music and transmits signals of music visualization to the video screen 160 to display based on the music visualization technology known in the art. Coupled with the video screen 160, the flashing of the lighting system 100 becomes part of the music visualization that forms a special light show using the article of clothing 102.

The invention has been described in terms of preferred embodiments thereof, but is more broadly applicable as will be understood by those skilled in the art. The scope of the invention is only limited by the scope of the following claims and equivalents thereof.

I claim:

1. A lighting system mounted on an article of clothing, the lighting system comprising:
    an illuminating object mounted on the article and connected to a power source and a processing unit, the illuminating object is capable of emitting light and flashing; the illuminating object and the power source are coated with a protective material so that the illuminating object and the power source are sealed and insulated and the power source is recharged by a wireless means;
    a receiver adapted to receive a signal of music;
    the processing unit capable of analyzing the music transmitted from the receiver and commanding the illuminating object to flash based on the music.

2. The lighting system in claim 1, wherein the power source comprises a solar panel.

3. The lighting system in claim 1, wherein the power source comprises a solar thermal collector such that the power source is capable of being recharged through heat.

4. The lighting system in claim 1, wherein the power source can be recharged through inductive charging.

5. The lighting system in claim 1, wherein the receiver comprises a microphone that is capable of receiving a voice command.

6. The lighting system in claim 1, wherein the receiver comprises a microphone and the signal received by the receiver is the music being played in a surrounding; and
    the processing unit is capable of instantly analyzing the music being played in the surrounding and commanding the illuminating object to flash based on the music.

7. The lighting system in claim 1, wherein the signal received by the receiver is a wireless signal such that the lighting system is capable of communicating with a wireless device.

8. The lighting system in claim 1, the article further comprises a video screen mounted on the article.

9. The lighting system in claim 7 further comprises a headphone and a microphone.

10. The lighting system in claim 9, wherein the wireless device is a cell phone and the lighting system is capable of pairing with the cell phone such that the headphone and the microphone can be used in a phone conversation.

11. The lighting system in claim 10, wherein the illuminating object is capable of indicating an incoming call by emitting light.

12. The lighting system in claim 9 further comprises a memory to store the music received from the receiver such that the music can be replayed through the headphone while the illuminating object is flashing based on the music.

13. A system for coordinating lighting effects of a plurality of articles of clothing, the system comprising:
    a plurality of lighting systems, each mounted on each of the article of clothing, the lighting system having a power source, an illuminating object capable of emitting light and flashing; a receiver adapted to receive a signal of music; a processing unit capable of analyzing the music transmitted from the receiver and commanding the illuminating object to flash based on the music;
    the lighting systems are capable of communicating wirelessly to coordinate the lighting effects;
    the illuminating object and the power source are coated with a protective material so that the illuminating object and the power source are sealed and insulated and the power source is recharged by a wireless means.

14. The system in claim 13, wherein the receiver comprises a microphone and the signal received by the receiver is the music being played in a surrounding; and the processing unit is capable of instantly analyzing the music being played in the surrounding and instantly commanding the illuminating object to flash based on the music.

15. The system in claim 13, wherein the signals received by the receiver are wireless signals such that the lighting system is capable of communicating with a wireless device.

16. The system in claim 15, wherein the wireless device is a lighting system among the plurality of lighting systems.

* * * * *